(12) United States Patent
Stephani et al.

(10) Patent No.: US 10,774,723 B2
(45) Date of Patent: Sep. 15, 2020

(54) METHOD AND DEVICE FOR DIAGNOSING A DIFFERENTIAL PRESSURE SENSOR OF A PARTICLE FILTER

(71) Applicant: Robert Bosch GmbH, Stuttgart (DE)

(72) Inventors: Martin Stephani, Ludwigsburg (DE); Martin Brandt, Sachsenheim (DE); Yunjie Lian, Hemmingen (DE)

(73) Assignee: Robert Bosch GmbH, Stuttgart (DE)

( * ) Notice: Subject to any disclaimer, the term of this patent is extended or adjusted under 35 U.S.C. 154(b) by 213 days.

(21) Appl. No.: 16/020,539

(22) Filed: Jun. 27, 2018

(65) Prior Publication Data

US 2019/0010853 A1 Jan. 10, 2019

(30) Foreign Application Priority Data

Jul. 6, 2017 (DE) .......................... 10 2017 211 575

(51) Int. Cl.
| | |
|---|---|
| *G01M 15/10* | (2006.01) |
| *F01N 11/00* | (2006.01) |
| *F01N 3/021* | (2006.01) |

(52) U.S. Cl.
CPC ............ F01N 11/002 (2013.01); *F01N 3/021* (2013.01); *F01N 2550/04* (2013.01); *F01N 2550/24* (2013.01); *F01N 2560/08* (2013.01); *F01N 2900/0418* (2013.01); *F01N 2900/08* (2013.01); *F01N 2900/1406* (2013.01)

(58) Field of Classification Search
CPC ...... F01N 11/00; F01N 11/002; F01N 11/005; F01N 2550/00; F01N 2900/1406

USPC ............................ 73/114.69, 114.75, 114.76
See application file for complete search history.

(56) References Cited

U.S. PATENT DOCUMENTS

| | | | | |
|---|---|---|---|---|
| 7,264,642 | B2 * | 9/2007 | Hamahata ............. | F01N 3/0231 55/282.2 |
| 7,357,822 | B2 * | 4/2008 | Hamahata ............... | F01N 9/002 55/282.2 |
| 8,688,360 | B2 * | 4/2014 | Norden ................. | F01N 11/002 180/65.1 |
| 2007/0119228 | A1 * | 5/2007 | Reichl ................. | F02D 41/2441 73/1.59 |
| 2008/0215205 | A1 * | 9/2008 | Kariya ................. | F01N 11/002 701/31.4 |
| 2014/0230409 | A1 * | 8/2014 | Lampen ................. | F01N 3/027 60/274 |
| 2015/0020504 | A1 * | 1/2015 | Nicole ................. | F01N 11/002 60/274 |

(Continued)

FOREIGN PATENT DOCUMENTS

| | | |
|---|---|---|
| DE | 102014209718 A1 | 11/2015 |
| DE | 102014209840 A1 | 11/2015 |

*Primary Examiner* — Eric S. McCall
(74) *Attorney, Agent, or Firm* — Norton Rose Fulbright US LLP; Gerard Messina

(57) ABSTRACT

In a method and a device for diagnosing a differential pressure sensor of a particle filter of an internal combustion engine, where the differential pressure sensor is connected via a first pressure line to an exhaust-gas system upstream from the particle filter and via a second pressure line to the exhaust-gas system downstream from the particle filter and upstream from a rear muffler, a diagnosis of the first or second pressure lines is performed by evaluating a comparison of a differential pressure signal from a differential pressure sensor with modeled pressure values.

10 Claims, 1 Drawing Sheet

(56) References Cited

U.S. PATENT DOCUMENTS

| | | | |
|---|---|---|---|
| 2016/0251995 A1* | 9/2016 | Tsunooka | F01N 3/021 |
| | | | 701/33.7 |
| 2018/0112581 A1* | 4/2018 | Han | F01N 3/021 |
| 2018/0202342 A1* | 7/2018 | Pannuzzo | F01N 9/002 |
| 2018/0238251 A1* | 8/2018 | Sammer | F01N 9/002 |
| 2019/0048776 A1* | 2/2019 | Van Nieuwstadt | F01N 1/168 |
| 2019/0048777 A1* | 2/2019 | Rollinger | F01N 3/021 |
| 2019/0257235 A1* | 8/2019 | Van Nieuwstadt | F01N 11/002 |
| 2019/0292969 A1* | 9/2019 | Van Nieuwstadt | F01N 11/002 |
| 2019/0323408 A1* | 10/2019 | Zhang | G01N 15/06 |

\* cited by examiner

METHOD AND DEVICE FOR DIAGNOSING A DIFFERENTIAL PRESSURE SENSOR OF A PARTICLE FILTER

CROSS-REFERENCE TO RELATED APPLICATIONS

The present application claims priority under 35 U.S.C. § 119 to DE 10 2017 211 575.0, filed in the Federal Republic of Germany on Jul. 6, 2017, the content of which is hereby incorporated by reference herein in its entirety.

FIELD OF THE INVENTION

The present invention relates to a method and a device for diagnosing a particle filter.

BACKGROUND

From the document DE 10 2014 209 840 A1, a method and a device for diagnosing a particle filter are known, in which a differential pressure of a particle filter, i.e., a pressure upstream and downstream from the particle filter, is evaluated.

SUMMARY

In contrast, the method according to the present invention and the device according to the present invention for diagnosing a differential pressure sensor of an internal combustion engine have the advantage that it is not only a diagnosis of the particle filter on the basis of the differential pressure sensor that takes place but also a diagnosis of the correct functioning of the differential pressure sensor. The method according to the present invention and the device according to the present invention especially also allow for a check as to whether the differential pressure sensor is still correctly connected to a sampling point for the pressure upstream from the particle filter or to a sampling point for the pressure downstream from the particle filter. This makes it possible to improve the robustness of the entire system, and to ensure the proper functioning of the particle filter or the exhaust-purification system.

The ascertainment of the cross-correlation of the measured pressure drop over the particle filter and a modeled pressure drop is particularly reliable. A fault in the first pressure line is already able to be identified simply by evaluating this first cross-correlation. A further improvement in the diagnosis quality is obtained if a modeled pressure drop over the rear muffler is additionally taken into account. This can be done in a particularly reliable manner if a second cross-correlation of the measured pressure drop over the particle filter and a modeled pressure drop over the particle filter and the rear muffler is formed. A comparison with the first cross-correlation or the standard deviation of the first and the second cross-correlation in particular allows for a reliable identification of faults of the second pressure line, which supplies a pressure downstream from the particle filter. The quality of the identification of faults of the second pressure line is further improved if the time characteristic of the first and the second correlation is evaluated in addition. An ascertainment of a third cross-correlation of the measured pressure drop over the particle filter and a modeled pressure drop over the rear muffler results in a very precise diagnosis of faults of the first pressure line, which provides a pressure upstream from the particle filter. Faults of the first pressure line are able to be identified in a reliable manner by a comparison with the first cross-correlation. In addition, the algebraic signs of the first and the third cross-correlations can also be evaluated for such a purpose. Exemplary embodiments of the present invention are shown in the drawing and described in greater detail in the following description.

DETAILED DESCRIPTION

Figure 1:
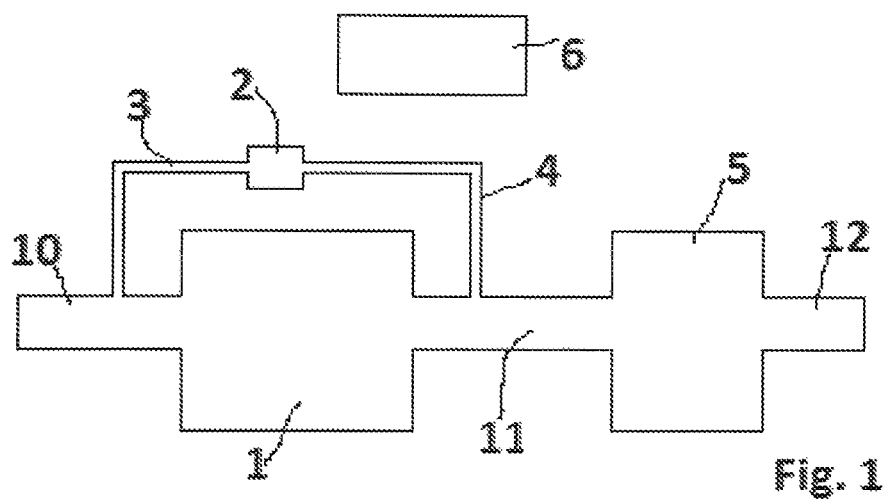
FIG. 1 illustrates an exhaust-gas system having a particle filter, a rear muffler, and a differential pressure sensor, according to an example embodiment of the present invention.

FIG. 1 shows an exhaust-gas system having a particle filter 1 and a rear muffler 5. An exhaust-gas supply 10 routes exhaust gases from an internal combustion engine to particle filter 1, where they flow through particle filter 1, then through an exhaust-gas connection pipe 11, through rear muffler 5, and are then output by exhaust-gas discharge 12 to the environment. The passage through particle filter 1 causes particles contained in the exhaust gas to be filtered out of the exhaust-gas flow so that only exhaust gas that is largely free of particles is conveyed to rear muffler 5 through exhaust-gas connection pipe 11. An acoustic damping then takes place in rear muffler 5 so that the exhaust gases generate only a low or an at least reduced noise level when exiting through exhaust-gas discharge 12.

A differential pressure sensor 2 is provided in order to identify, among other things, how many particles from the exhaust gas were already stored in particle filter 1 due to the filtering operation. By evaluating the differential pressure upstream and downstream from the particle filter in the exhaust-gas flow, it is possible to assess how many particles have already been stored in particle filter 1 since the particles present in particle filter 1 reduce the cross-section that is available for the through-flow, and the pressure drop over particle filter 1 consequently constitutes a measure for the loading, i.e., for the quantity of particles retained in particle filter 1. For this purpose, differential pressure sensor 2 is connected by way of a first pressure line 3 to exhaust-gas supply 10 upstream from the particle filter, and by way of a second pressure line 4 to exhaust-gas connection pipe 11 downstream from particle filter 1. Differential pressure sensor 2 includes a diaphragm whose deflection is a function of the relative pressure in first pressure line 3 and in second pressure line 4, and which generates a corresponding differential-pressure signal. If it is determined on the basis of the signal from differential pressure sensor 2 that particle filter 1 holds a large quantity of particles, then it is possible to initiate what is known as a regeneration process as a function of further marginal conditions. During such a regeneration process, the particles held in particle filter 1 are combusted through an oxidation, i.e., are converted into gaseous products. To perform this regeneration, i.e., the combustion of the particles held in particle filter 1, a corresponding temperature is to be produced in particle filter 1, and the exhaust gas conveyed through exhaust-gas supply 10 should still have a sufficient quantity of oxygen in order to carry out the oxidation in particle filter 1. Such regeneration processes are able to be carried out by a corresponding control of the internal combustion engine.

In this context, it is important for the measuring signals from differential pressure sensor 2 to allow for a reliable determination of the loading of particle filter 1. It has been shown that first pressure line 3 and second pressure line 4 are susceptible to faults. More specifically, a hole or a leaking connection point or a detachment of a hose connection can occur in both pressure lines, with the result that, it is not the pressure upstream or downstream from the particle filter, but rather the ambient pressure that is applied either at first pressure line 3 or second pressure line 4. The diagnosis according to the present invention now provides a method and a device for a reliable identification of faults in the pressure lines upstream and downstream from particle filter 1.

To diagnose differential pressure sensor 2 or first and second pressure lines 3, 4 of differential pressure sensor 2, it is provided to evaluate the measured signal from the differential pressure sensor and the modeled signals of pressures in the exhaust-gas system using cross-correlation functions or cross-correlation coefficients (CCF) calculated therefrom. A cross-correlation function expresses the degree to which two signals resemble each other or are congruent. For example, if the particle filter is completely empty, then the pressure drop over particle filter 1 is only very small, i.e., the measured differential pressure signal and the modeled pressure signal correspond to each other and are therefore very similar to each other. Depending on the loading of particle filter 1, the similarity of the pressure upstream and downstream from the particle filter will vary. In addition, for example, the counter pressure of rear muffler 5 also heavily affects the pressure downstream from the particle filter. Moreover, all pressure relationships in the exhaust-gas system also depend on the temperatures and the quantity of the exhaust gas that is passing through. These different pressures are now able to be utilized for carrying out a diagnosis of the differential pressure sensor or of first pressure line 3 and second pressure line 4.

To do so, a cross-correlation coefficient 1 (CCF1) is first formed for the diagnosis of the differential pressure sensor, which is calculated in the following manner:

$$CCF1 \sim \Sigma_{20sec}(\Delta p_{Filter,measure} * \Delta p_{Filter,model})/\Sigma_{20sec} (\Delta p_{Filter,model})^2$$

To calculate CCF1, the signal is integrated or summed up across a predefined time period (20 sec in this instance). However, other time periods such as 5 sec are also possible, provided the time period is long enough to calculate a stable cross-correlation or a stable cross-correlation coefficient. Signal $\Delta p_{Filter,measure}$ is the measured value of the differential pressure, i.e., the output signal from the differential pressure sensor. Value $\Delta P_{Filter,model}$ is a modeled value for the pressure drop over the particle filter. This value is ascertained during the application of the internal combustion engine and the exhaust-gas system by measuring typical operating values. They are then stored in a characteristics map, e.g., as a function of the load and the rotational frequency, and used for calculating a modeled differential pressure over particle filter 1. In addition to the loading and the rotational frequency, it is also possible to include still further values in the calculation of this differential pressure $\Delta p_{Filter,model}$, e.g., the temperature and a modeled loading of particle filter 1.

With the aid of this first CCF1, it is consequently measured to what extent the differential pressure over particle filter 1 actually measured at differential pressure sensor 2 corresponds to a differential pressure over particle filter 1 measured on a model. If interference occurs in first pressure line 3 or in second pressure line 4, then this will affect the actually measured differential pressure signal from differential pressure sensor 2 but will not have any effect on the modeled differential pressure since the latter occurs simply due to a model creation.

Figure 2:
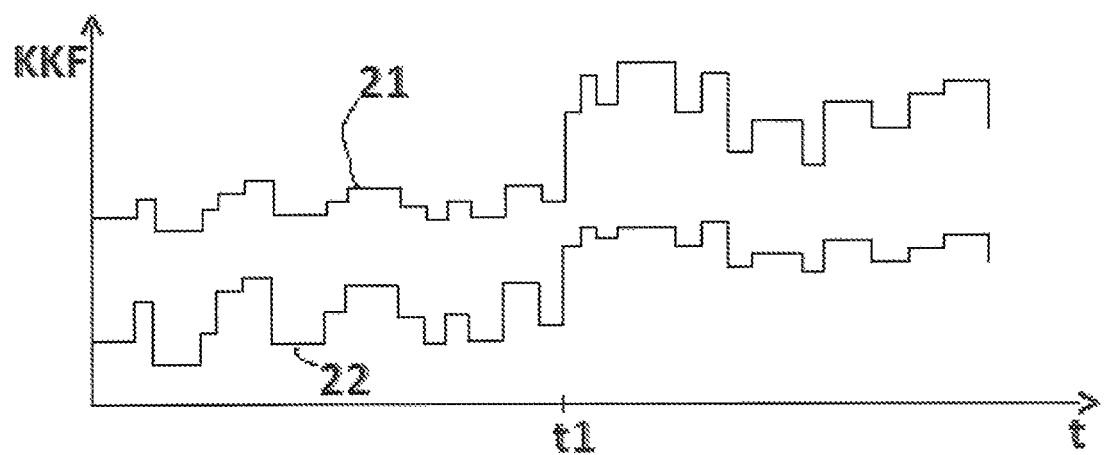
FIG. 2 illustrates a time characteristic of a first and a second cross-correlation, which are used for a diagnosis of a fault-free case and a defective case, according to an example embodiment of the present invention.

FIG. 2 illustrates the time characteristic of the value of CCF1 in relation to time tin curve 21. At instant t1, a drop occurs in second pressure line 4, which manifests itself in a corresponding change in curve 21. Prior to instant t1, the value for CCF1 fluctuates around a first value at a slight standard deviation. At instant t1, at which a fault occurs in second pressure line 4, the value of CCF1 abruptly changes to an increased value and especially exhibits a clearly greater fluctuation in the further time characteristic, or, in other words, has a clearly greater standard deviation. Slight fluctuations of the value for CCF1 occur prior to instant t1, these fluctuations coming about because the actually measured signal for the differential pressure and the modeled signal are not completely identical, especially due to dynamic operating states, e.g., variations in the loading and the rotational frequency. However, a fault in second pressure line 4 occurs at instant t1 to the effect that this line comes into contact with the ambient air, so that it is no longer the pressure in exhaust-gas connection line 11 between particle filter 1 and rear muffler 5 that is conveyed to differential pressure sensor 2 but rather a constant ambient pressure (which varies only as a result of the geodetic altitude). The differential pressure actually measured by differential pressure sensor 2 and the modeled differential pressure thus exhibit only a considerably reduced similarity, with the result that the CCF1 rises considerably and exhibits clearly greater differences, especially as a function of the operating parameters of the internal combustion engine, e.g., the loading or the rotational frequency.

As a result, there is a considerably reduced similarity between the measured differential pressure signal from differential pressure sensor 2 and the modeled differential pressure in time ranges that follow instant t1, which especially also leads to a clearly greater standard deviation of the value of CCF1. However, since the extent of the abrupt change and also the respective standard deviation are difficult to express in absolute values and also heavily depend on the respective operating conditions of the internal combustion engine, it is advantageous for diagnostic purposes to compare these CCF1s with a further cross-correlation.

In this context, FIG. 2 shows a further curve for a cross-correlation 22, which is calculated in the following way:

$$CCF2 \sim \Sigma_{20sec}(\Delta p_{Filter,measure} * (\Delta p_{Filter,model} + \Delta p_{RM,model}))/\Sigma_{20sec}(\Delta p_{Filter,model} + \Delta p_{RM,model})^2$$

The newly added pressure differential $\Delta p_{RM,model}$ represents the modeled pressure differential over rear muffler 5. This modeled pressure differential, too, is calculated from values that are ascertained during an application phase of the internal combustion engine. For this purpose, a model of rear muffler 5 is formed on the basis of measured values that were obtained from a prototype of the internal combustion engine including a complete exhaust-gas system. The measured values ascertained in this application phase are stored in characteristic maps in the control unit. They then allow for the calculation of a pressure drop $\Delta p_{RM,model}$ of rear muffler 5 during an operation of the internal combustion engine, on the basis of operating parameters of the internal combustion engine, e.g., the loading and the rotational frequency. Using the value of CCF2, it is thus determined to what extent the differential pressure measured at differential pressure sensor 2 coincides with the modeled pressure drop over particle filter 1 and rear muffler 5. Since it is not only the modeled pressure drop over particle filter 1 that is considered in the calculation of this cross-correlation coefficient CCF2, but also the common pressure drop over particle filter 1 and rear muffler 5, this value will differ from value CCF1.

As can be gathered from the illustration in FIG. 2, in a fault-free case (no hose detachment), CCF2 differs to the extent that, prior to the occurrence of the fault in second pressure line 4 at instant t1, this value lies below the value of CCF1 and, above all, exhibits a greater variation, i.e., a greater standard deviation.

The value for CCF2 compares the pressure drop measured at differential pressure sensor 2 with the modeled pressure drop over particle filter 1 and rear muffler 5. The greater variation or the high standard deviation of CCF2 (in the fault-free case) is attributable to the fact that the measured differential pressure over the filter is compared with a modeled differential pressure over the filter and rear muffler. Due to the additional comparison with the modeled differential pressure over the RM, the values in the fault-free case are not similar. At instant t1, a break/detachment then occurs (in the case of a fault) in second pressure line 4, i.e., the ambient pressure is now applied on the one side of differential pressure sensor 2, or in other words, the pressure downstream from rear muffler 5.

At instant t1, an abrupt change in second cross-correlation coefficient CCF2 initially occurs since the measured differential pressure now rises because it is no longer measured exclusively over the filter, but rather over the filter and the environment. Put another way, the pressure dropping over the rear muffler is also measured indirectly.

This means that prior to the occurrence of the fault at instant t1, the standard deviation for CCF1 is small and the standard deviation for CCF2 is high. After the occurrence of the fault at instant t1, the relationships are reversed to the extent that the standard deviation for CCF1 is high and the standard deviation for CCF2 is small. This fact can be utilized for ascertaining the fault case for second pressure line 4, i.e., the pressure line downstream from particle filter 1. By evaluating the standard deviation of the two cross-correlation coefficients CCF1 and CCF2, it is therefore possible to reliably identify whether second pressure line 4, which conveys the pressure downstream from particle filter 1 to differential pressure sensor 2, is still correctly measuring the pressure signal downstream from particle filter 1, or else that the ambient pressure is applied there as the result of a mechanical fault. This makes it possible to carry out a reliable hose-line diagnosis of the differential pressure sensor.

If the two cross-correlation coefficients CCF1 and CCF2 are monitored during the ongoing operation, an occurrence of the fault in second pressure line 4 during the ongoing operation, i.e., at instant t1, is also able to be identified on the basis of the related abrupt change in CCF1 and CCF2. However, if the fault occurs when no evaluation of the signals takes place, then such a fault is identifiable only if the corresponding values are stored in the meantime, such as in control unit 6. For instance, this can be the case when the internal combustion engine is used in a motor vehicle and control unit 6 is not active during the standstill of the motor vehicle and carries out the signals from differential pressure sensor 2 or the necessary calculations for CCF1 and CCF2. In such a scenario, the occurrence is able to be identified by storing the values of CCF1 and CCF2 and, even better, also the values for the standard deviations in the control unit prior to the standstill, the values then being available when the vehicle or control unit 6 is put into operation again.

In addition, a diagnosis of faults of first pressure line 3 can be performed as well. A further cross-correlation coefficient CCF3 is calculated for such a purpose as follows:

$$CCF3 \sim \Sigma_{20sec}(\Delta p_{Filter,measure} * \Delta p_{RM,model}) / -\Sigma_{20sec}(\Delta p_{RM,model})^2$$

This CCF3, too, would exhibit a large standard deviation prior to the occurrence of a fault in first pressure line 3, and show a small standard deviation following the occurrence of a fault in first pressure line 3. Similar to FIG. 2, a fault identification pertaining to a fault in first pressure line 3, in particular the application of an ambient pressure at first pressure line 3, can then also be identified through a corresponding comparison.

However, a fault identification in first pressure line 3 can also take place simply by evaluating the value of CCF1. If no fault is present, then the value of CCF1 is positive. If a fault arises, i.e., if ambient pressure occurs in first pressure line 3, then this creates a situation in which the measured pressure upstream from particle filter 1 is lower than the measured pressure downstream from the particle filter, or in other words, the pressure drop in the particle filter is negative, i.e., the gas would not lose pressure when flowing through particle filter 1 but would experience a pressure increase. This then has the result that the value of CCF1 changes its algebraic sign and becomes negative. A fault in first pressure line 3, which causes ambient pressure to be applied in first pressure line 3, would therefore be detectable very easily solely on the basis of the evaluation of CCF1.

In addition, it would also be the case that the value of CCF3 would change its algebraic sign in the event of a fault in first pressure line 3. This means that a fault in the first pressure line would also be identifiable by evaluating only the value of CCF3, simply because of the change in the algebraic sign of the value of CCF3.

What is claimed is:

1. A method for diagnosing connections, to an exhaust-gas system, of a differential-pressure sensor of a particle filter of an internal combustion system, the differential-pressure sensor being connected (a) via a first pressure line to the exhaust-gas system upstream from the particle filter, and (b) via a second pressure line to the exhaust-gas system downstream from the particle filter and upstream from at least one rear muffler, comprising the following steps:
   ascertaining a measured pressure drop over the particle filter from a differential pressure signal from the differential-pressure sensor;
   forming a first cross-correlation of the measured pressure drop and a modeled pressure drop over the particle filter, the modeled pressure drop over the particle filter being ascertained using a first stored characteristics map;
   comparing the first cross-correlation to a modeled pressure drop over the rear muffler, the modeled pressure drop over the rear muffler being ascertained using a second stored characteristics map; and
   determining a fault of the first or second pressure line based on the comparing.

2. The method of claim 1, further comprising the following step:
   forming a second cross-correlation of the measured pressure drop, the modeled pressure drop over the particle filter, and the modeled pressure drop over the rear muffler;

wherein the comparison includes comparing the second cross-correlation to the first cross-correlation, and wherein the determining of the fault of the first or second pressure line includes determining a fault of the second pressure line in response to a standard deviation of the first cross-correlation exceeding a standard deviation of the second cross-correlation.

3. The method of claim 2, wherein the determining of the fault of the first or second pressure line includes evaluating a magnitude of the first and second cross-correlations, evaluating an abrupt change in the magnitude of the first and the second cross-correlations in a direction of an increase, and determining, based on the abrupt change, the fault of the second pressure line.

4. The method of claim 1, further comprising the following step:
forming a second cross-correlation of the measured pressure drop over the particle filter and the modeled pressure drop over the rear muffler;
wherein the comparison includes comparing the second cross-correlation to the first cross-correlation, and wherein the determining of the fault of the first or second pressure line includes determining a fault of the first pressure line responsive to a standard deviation of the first cross-correlation exceeding a standard deviation of the second cross-correlation.

5. The method of claim 4, wherein the determining of the fault of the first or second pressure line includes evaluating an algebraic sign of the first or second cross-correlations, and determining the fault of the first pressure line responsive to a change in the evaluated algebraic sign.

6. A device for diagnosing connections, to an exhaust-gas system, of a differential pressure sensor of a particle filter of an internal combustion engine, the differential pressure sensor being connected (a) via a first pressure line to the exhaust-gas system upstream from the particle filter, and (b) via a second pressure line to an exhaust-gas system downstream from the particle filter and upstream from a rear muffler, the device comprising:
a processor, wherein the processor is configured to:
obtain a differential pressure signal from a pressure sensor;
ascertain a measured pressure drop over the particle filter from the obtained differential pressure signal;
form a first cross-correlation of the measured pressure drop and a modeled pressure drop over the particle filter, the modeled pressure drop over the particle filter being ascertained using a first stored characteristics map;
compare the first correlation to a modeled pressure drop over the rear muffler, the modeled pressure drop over the rear muffler being ascertained using a second stored characteristics map; and
determine a fault of the first or second pressure line based on the comparing.

7. The device of claim 6, wherein the processor is further configured to:
form a second cross-correlation of the measured pressure drop, the modeled pressure drop over the particle filter, and the modeled pressure drop over the rear muffler;
wherein the comparison includes comparing the second cross-correlation to the first cross-correlation, and wherein the determination of the fault of the first or second pressure line includes determining a fault of the second pressure line in response to a standard deviation of the first cross-correlation exceeding a standard deviation of the second cross-correlation.

8. The device of claim 7, wherein the determination of the fault of the first or second pressure line includes the processor evaluating a magnitude of the first and second cross-correlations, evaluating an abrupt change in the magnitude of the first and the second cross-correlations in a direction of an increase, and determining, based on the abrupt change, the fault of the second pressure line.

9. The device of claim 6, wherein the processor is further configured to:
form a second cross-correlation of the measured pressure drop over the particle filter and the modeled pressure drop over the rear muffler;
wherein the comparison includes the processor comparing the second cross-correlation to the first cross-correlation, and wherein the determination of the fault of the first or second pressure line includes determining a fault of the first pressure line responsive to a standard deviation of the first cross-correlation exceeding a standard deviation of the second cross-correlation.

10. The device of claim 9, wherein the determination of the fault of the first or second pressure line includes the processor evaluating an algebraic sign of the first or second cross-correlations, and determining the fault of the first pressure line responsive to a change in the evaluated algebraic sign.

* * * * *